United States Patent
Gass

(10) Patent No.: US 7,411,940 B2
(45) Date of Patent: Aug. 12, 2008

(54) LOCATION INFORMATION FOR REMOTE USER

(75) Inventor: Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 629 days.

(21) Appl. No.: 10/949,246

(22) Filed: Sep. 27, 2004

(65) Prior Publication Data
US 2005/0094627 A1    May 5, 2005

(30) Foreign Application Priority Data
Nov. 3, 2003   (EP) ................... 03025153
Dec. 4, 2003   (EP) ................... 03027831

(51) Int. Cl.
  *H04L 12/66* (2006.01)
(52) U.S. Cl. ...................... 370/352; 370/401
(58) Field of Classification Search ........ None
  See application file for complete search history.

(56) References Cited

U.S. PATENT DOCUMENTS

| 4,996,685 | A | * | 2/1991 | Farese et al. | 370/352 |
| 5,983,282 | A | | 11/1999 | Yucebay | |
| 6,717,918 | B1 | * | 4/2004 | Donzis et al. | 370/254 |
| 2002/0162029 | A1 | | 10/2002 | Allen et al. | |
| 2003/0063714 | A1 | | 4/2003 | Stumer et al. | |

* cited by examiner

*Primary Examiner*—Chau T. Nguyen
*Assistant Examiner*—Dargaye H Churnet
(74) *Attorney, Agent, or Firm*—Sughrue Mion, PLLC

(57) ABSTRACT

A remote user will set up a telecommunication from some remote terminal to some remote access server through a telephone network. Such telephone network will provide calling line identity information of said remote terminal to said remote access server while this first telecommunications being identified by said remote access server as being performed by a remote worker. The remote access server will then acknowledge said telecommunications by rejecting it with some tag. The remote access server will also register the received calling line identity information to which it will associate said forwarded tag. After a complete disconnection of the telecommunications, the remote terminal will initiate an Internet protocol session to said remote access server using the received tag. The remote access server will then be able to identify said remote terminal while the identification procedure be based on the use of the registered calling line identity affected to said tag.

13 Claims, 1 Drawing Sheet

LOCATION INFORMATION FOR REMOTE USER

TECHNICAL FIELD

The present invention relates to a method to set up an Internet Protocol session from a remote terminal via a remote access server using a telephone network being able to send calling line identity information. Furthermore, it is related to a computer readable medium having a computer program recorded thereon, the computer program comprising codes adapted to perform steps of said method to set up an Internet Protocol session when said computer program is run on a computer possibly being said remote access server. It is also related to a computer readable medium having a computer program recorded thereon, the computer program comprising codes adapted to perform steps of said method to set up an Internet Protocol session when said computer program is run on a remote terminal. The invention is based on the priority applications EP 03 025 153.2, EP 03 027 831.1 which are hereby incorporated by reference.

BACKGROUND OF THE INVENTION

A recent societal trend calls for more employees to work from home or other sites that are remote from the corporate office. This is achieved via remote access to data networks.

The traditional way remote employees accessed the corporate network is via Long Distance dial to a remote access server in the corporate data center. Such remote access server or local call server is a device that answers incoming phone calls with racks of modems, authenticates users as authorized data users (not hackers) and hands data queries to the corporate network. Dozens or even hundreds of remote users or workers may almost simultaneously dial in to dozens or hundreds of modems, in one remote access server.

Internet Service Providers are now setting up Internet Protocol IP access in remote access server nodes all over the world. The IP network can give them a great way to provide access to remote users.

The traditional approach takes bursty data traffic and it carries it on Constant Bit Rate telephone calls circuits for such a long distance—usually all the way to corporate headquarters. This explains why they are quite expensive. And the bursty traffic inefficiently uses the circuit bandwidth, because there are often long periods of silence. In contrary, the Internet Service Provider ISP remote access service can be more efficient because ISP carries the data call on a circuit for only a short distance—the local phone call distance between the remote user and a remote access server in a local office. The remote access server will terminate the circuits of multiple users, multiplex the bursty data efficiently into one packet stream, and conserve long distance circuits. This last service for support of remote and mobile employees is often named Dial Internet Protocol, Virtual Private Dial Networking, or simply remote access.

An example of a software supporting such remote access is given by the product called Windows NT 4.0 Remote Access from Microsoft. With Windows NT remote access, remote access clients connect to remote access servers and are transparently connected to the remote access server, known as point-to-point remote access connectivity. Alternately, they are transparently connected to the network to which the remote access server is attached, known as point-to-LAN remote access connectivity. This transparent connection allows remote access clients to dial-in from remote locations and access resources as if they were physically attached to the network.

That software product provides two different types of remote access connectivity:

(i) Dial-up remote access, where a remote access client uses via the telecommunications infrastructure to create a temporary physical circuit or a virtual circuit to a port on a remote access server. Once the physical or virtual circuit is created, the rest of the connection parameters can be negotiated.

(ii) Virtual private network remote access where a client uses an IP network to create a virtual point-to-point connection with a remote access server acting as the virtual private network server. Once the virtual point-to-point connection is created, the rest of the connection parameters can be negotiated.

Nowadays, voice-over-IP (VOIP) starts to be of enough good quality that enterprise customers move to implement Voice-over-IP networks. It is directly related to the hope to decrease the costs associated with maintaining multiple networks and increase productivity as new applications are brought to market extending the application of voice communication. Voice-over-IP enables carrying voice traffic (for example, telephone calls and faxes) over an IP network. This support is implemented using voice packet technology. In voice-over-IP, the digital signal processor segments the voice signal into frames and stores them in voice packets. These voice packets are transported using IP in compliance with one or several signaling specifications. But when an enterprise network provides IP telephony service, it must be able to support so called Emergency Calling Service ECS also known in the US and Canada as E911. Indeed the enterprise network must have the capability of determining the user's location and call back number, routing the call to the appropriate Public Safety Answering Point PSAP, and conveying the location and call back information to that PSAP.

For an enterprise IP network to properly support ECS, it must achieve the following:
  Identify the location of ECS user and dispatch help to the correct location within a limited time;
  Connect the ECS call to the appropriate PSAP jurisdiction. The correct PSAP is usually the one nearest the user;
  Location information provide correct emergency location information number of the ECS user so that the PSAP can dispatch help to the correct location;
  Call back information provide the correct number for calling back the ECS user in case the call is disconnected.

The key to supporting the first three requirements is enterprise network determination of the user's location, regardless of the terminal access scenario.

SUMMARY OF THE INVENTION

In view of the above, it is an object of the present invention to provide a method and some computer program codes adapted for identifying the location of a remote user setting up an Internet Protocol session from a remote terminal to a remote access server.

This object starts to be of an issue when an user that has a telephony device installed, e.g. in a laptop computer, or other portable device, uses that device from a remote location to call an emergency calling service ECS when connected to the enterprise network. This is possible by applying a method in accordance with the invention to set up an Internet Protocol session from a remote terminal via a remote access server using a telephone network. It is required that the telephone network is able to send calling line identity information of said remote terminal when setting up a telecommunication. This is usually the case for telephone network based on integrated services digital network ISDN. At first, the remote user will set up a telecommunication from said remote terminal to said remote access server through the telephone network. Consequently, the telephone network will provide calling line identity information of said remote terminal to said remote access server while this first telecommunications being identified by said remote access server as being performed by a remote worker. The remote access server will then answer or acknowledge said telecommunications by rejecting it with some tag (e.g. reason for reject information element) to be forwarded to said telephone network. Said tag can comprise a specific label with some information of the reason for rejection. More or less in the same time, the remote access server will register the received calling line identity information to which it will associate said forwarded tag. The remote terminal will receive a disconnection message with said tag forwarded from said telephone network. Said further telecommunications will then be definitively disconnected. But advantageously, the remote terminal will possibly automatically initiate an Internet protocol session to said remote access server using said tag possibly but not exclusively together with some login procedure. When said remote terminal will be interconnected with the remote access server through said Internet Protocol session, then the remote access server will identify said remote terminal. The identification procedure will be based on the use of the registered calling line identity affected to said tag.

Once a remote user achieve to set up an Internet Protocol session from a remote terminal according to the invention, he will be in the situation to use that Internet Protocol session for the setup of a voice over Internet Protocol telecommunication VoIP. In such a way, he will be able to perform a VoIP telecommunications from his remote terminal to some user connected to the remote access server or even someone outside the enterprise network if such a remote access server would allow such service. The present invention provides the big advantage that when the remote user will use such VoIP telecommunications for an emergency call ECS, the remote access server will be able to forward user location from said remote terminal possibly but not exclusively to some public safety answering point. This user location will be extracted from the registered calling line identity corresponding to said remote terminal.

The invention also relates to computer readable medium having a computer program recorded thereon, the computer program comprising codes adapted to perform some steps of the above method to setup an Internet Protocol session. One of the computer program is running on a computer possibly being the remote access server which will at first accept the set up of a first telecommunications with some remote user through a telephone network being able to send calling line identity information. Said first telecommunications will be identified by the remote access server as being performed by a remote user. The remote access server will then register the corresponding calling line identity information from the remote terminal and forward a tag when rejecting the first telecommunications from said remote terminal. It is possibly this tag which will initiate on said remote terminal an Internet Protocol session after disconnection of the first telecommunications. At least, the tag will have to be forwarded when setting up the Internet Protocol session from the remote terminal to the remote access server. And then some codes of the computer program will be used to find out the registered calling line identity information affected to the received tag. Only then, the remote access server will be able to identify the remote terminal interconnected with it through said Internet Protocol session.

A second computer program is running on the remote terminal from where the remote user may initiate its call. That second program is adapted for setting up a first telecommunications to the remote access server through a telephone network providing calling line identity information of said remote terminal. Said first telecommunications will be specified by the remote terminal as being performed by a remote user. When the remote terminal will receive some tag forwarded from said remote access server, it will disconnect said telecommunications. And then, it will initiate an IP session to said remote access server using said tag. All these steps on the remote terminal may be launched possibly only after the remote user performed successfully some user access procedure like a login procedure.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

The present invention consists in synchronizing the enterprise server (remote access server) before a voice-over-IP call setup will be initiated by some user at a remote location i.e. outside the enterprise premise. At first an ISDN call setup will be initiated by a remote user on a remote terminal and established between the gateway at the remote location and the remote access server. This first telecommunications must be identified by the remote access server as being performed by some remote user. This may be achieved through different ways. A possibility could be by dialing a specific telephone number for setting up said first telecommunications, while said specific telephone number being associated to said remote access server and dedicated to remote users. An alternative could be given by transmitting to said remote access server some remote user indication together with the calling line identity information to be used by said remote access server for the identification of the first telecommunications as being performed by a remote user. Such remote user indication could be transmitted using e.g. User to User Messaging, some service supported by ISDN. This remote user indication could be set in a transparent way for the remote user e.g. by some software possibly on the remote terminal. The remote user would then have to perform successfully some user access procedure like a login prior to set up the first telecommunications.

When the first telecommunications will be identified by the remote access server as being performed by a remote user, it will initiate some steps on the remote access server specific for a remote user. At first, it will answer this first call by rejecting it and avoid extra costs while the call reference and CLI are stored for future synchronization. When rejecting it, the remote access server will use some tag to be forwarded to said remote terminal. The network will then forward a disconnection message together with this tag to the remote terminal.

After the reception of such specific tag, the remote terminal will activate the establishment of a session according to e.g. RTP (Real-time Transport Protocol) while the previously sent tag will be used as a synchronization word to establish the link between that specific session and the ISDN phone number from which it was set up. It is the reception of that tag by the remote access server when establishing the session that will make it possible to get location information in case of emergency call later on.

Figure 1A:
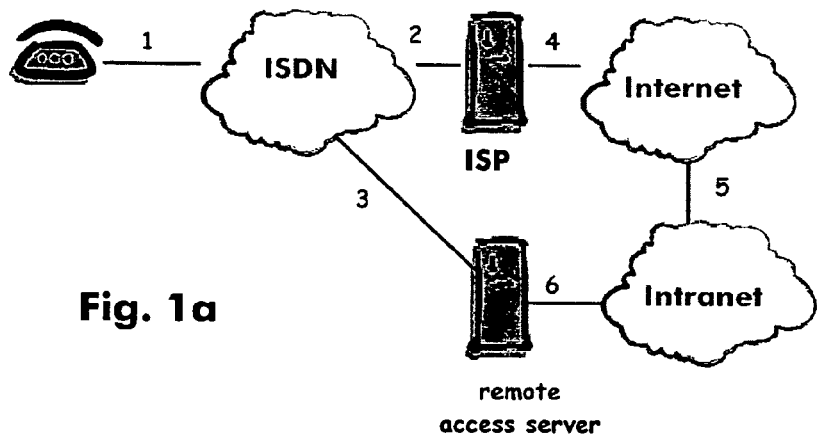
FIG. 1a is a schematic view of the different networks involved in the present invention.

On FIG. 1a is shown a remote terminal connected to a telephone network (1) here as ISDN. According to the invention, it is required, that the telephone network is able to send calling line identity information from that remote terminal as it is the case for an ISDN network. To that ISDN network is connected some internet service provider ISP via a connection (2) which is itself connected (4) to the Internet. Also is connected to the ISDN network a remote access server of an enterprise via connection (3). Such remote access server is itself connected (6) to some Intranet, typically a network accessible only for a restricted number of users usually the employees of that enterprise. The Intranet is also connected to the Internet (5) while usually between both is placed at least a firewall not shown on that figure.

Figure 1B:
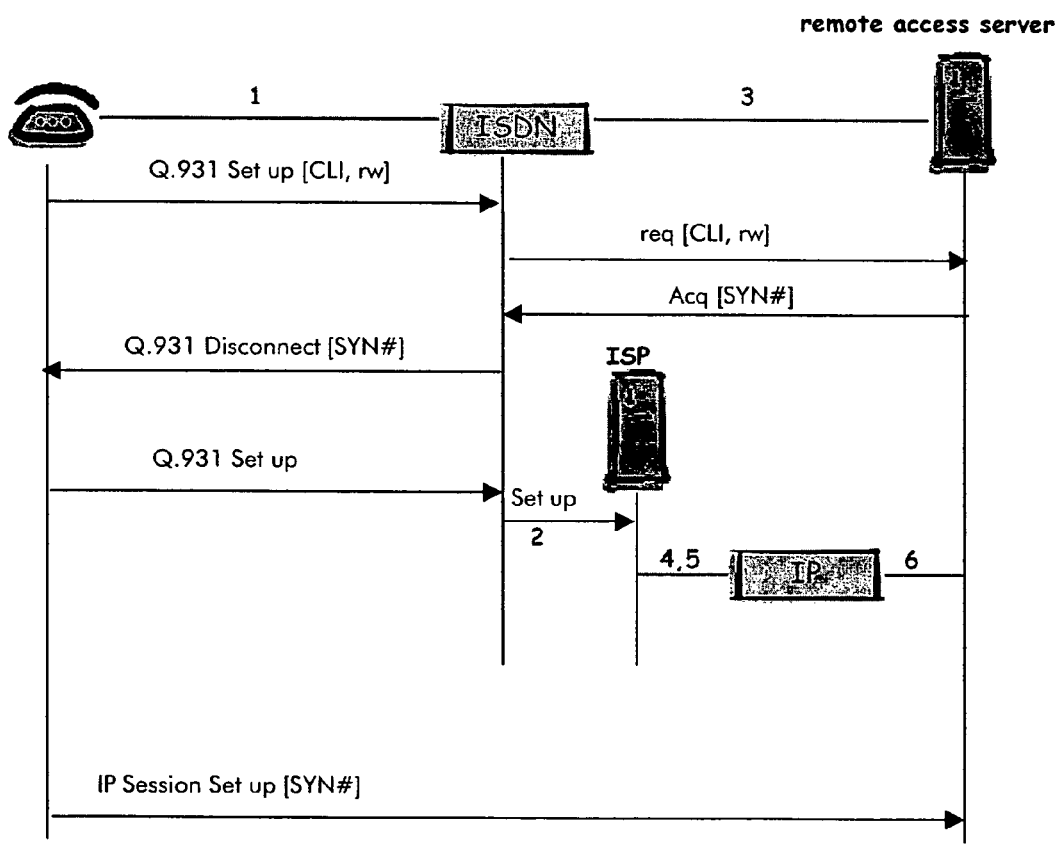
FIG. 1b describes different possible steps according to the invention.

On FIG. 1b is shown different steps according to the invention and following FIG. 1a. At first, a set up of a telecommunication from said remote terminal to the remote access server is initiated by the user at its remote location. It can be of advantage to authorize such set up only after performing successfully some user access procedure like a login usually on the remote terminal. That set up follows usual standard Q.931 adapted for telephone network able to send calling line identity information CLI of that remote location, together with some remote user (rw) indication to the remote access server. This remote user (rw) indication transmitted possibly using User to User signaling, will be used by the remote access server to identify that call as being performed by a remote user. In such a way, it can differentiate the specific call performed by remote users from the "usual" call for which no specific procedure must be applied. The remote access server will then answer such telecommunications coming from a remote user by rejecting it while such rejection being characterized with some tag (SYN#). Possibly at the same time, the remote access server will register the received calling line identity information from that remote location together with the tag sent. Such rejection of the first telecommunications will be forwarded together with the tag (e.g. together with login password) by the telephone network to the remote terminal. The reception of a characteristic disconnection message according to Q.931 will definitely disconnect said telecommunications while the remote terminal will keep track of the received tag. This tag will be used in the following initiation of an Internet protocol session from the remote terminal to the remote access server. Such IP session set up may be based on any protocol stack (HTTP, SIP, H.323). The tag SYN# parameter is the reference that is to be used at IP Session set up to be able to make the relationship between this particular session and the corresponding calling line identity information CLI. It might also be directly the CLI value, making it possible to handle location of the remote terminal.

Such an IP session can be advantageously used for a VoIP telecommunications particularly for an emergency call. The set up of the Internet protocol session can be performed via an Internet Service Provider ISP. Through such ISP using connection 4, 5, 6 (see FIG. 1a and FIG. 1b) it will also be possible to access to the remote access server. It might be preferable in that case to have to perform some login procedure to be allowed to access the Intranet i.e. to be let in by the Firewall. Alternately, it is possible to reach the remote access server by dialing a specific telephone number for setting up said first telecommunications. Such specific telephone number being associated to the remote access server will be dedicated for the set up of an Internet Protocol session according to the invention.

Once some user at a remote location performed an emergency call as VoIP via an IP session according to the invention with the remote access server, that remote access server will know the remote location. It will then have to determine the right emergency service zone and corresponding number. This can be done as usual, manually at location information server configuration, or through dialogue between the remote access server and the public location information server database.

The invention claimed is:

1. A method to set up an Internet Protocol session from a remote terminal via a remote access server using a telephone network being able to send calling line identity information, the method comprising the steps of:

setting up a first telecommunications from said remote terminal to said remote access server through said telephone network providing calling line identity information of said remote terminal to said remote access server while said first telecommunications is identified by said remote access server as being performed by a remote user;

answering said first telecommunications by said remote access server by rejecting said first telecommunications with a tag to be forwarded to said remote terminal by said telephone network;

registering by said remote access server of the received calling line identity information to be associated with said tag;

disconnecting said first telecommunications by said remote terminal when receiving said tag forwarded from said telephone network to said remote terminal;

initiating an Internet Protocol session from said remote terminal to said remote access server using said tag;

identifying said remote terminal by said remote access server when the remote access server is interconnected with the remote terminal through said Internet Protocol session, wherein said identifying is based on the registered calling line identity information affected to said tag.

2. The method according to claim 1, further comprising transmitting to said remote access server a remote user indication together with the calling line identity information to be used by said remote access server for identifying the first telecommunications performed by the remote user.

3. The method according to claim 1, further comprising dialing a predetermined telephone number for setting up said first telecommunications, wherein said predetermined telephone number is associated with said remote access server and dedicated to the remote user.

4. The method according to claim 1, further comprising performing a user access procedure by said remote user before setting up said first telecommunications.

5. The method according to claim 1, further comprising utilizing said Internet Protocol session for setting-up a voice over Internet Protocol (VoIP) telecommunications as an emergency call, including forwarding by said remote access server a user location from said remote terminal a public safety answering point by using the registered calling line identity information corresponding to said remote terminal.

6. The method according to claim 1, further comprising setting-up Internet Protocol session via an Internet Service Provider to be reached through said telephone network.

7. A computer readable medium having a computer program recorded thereon, the computer program comprising codes adapted to perform the following steps when said computer program is run on a computer comprising a remote access server:
- accepting set up of a first telecommunications with a remote terminal through a telephone network capable of sending calling line identity information while identifying said first telecommunications as being performed by a remote user;
- answering said first telecommunications by said remote access server by rejecting the first telecommunications with a tag to be forwarded to said remote terminal;
- registering by said remote access server the received calling line identity information to be associated with said tag;
- accepting initiation of an Internet Protocol session from said remote terminal to said remote access server using said tag.

8. The computer readable medium according to claim 7, wherein said computer program initiated after detection by the remote access server of a remote user indication received together with the calling line identity information.

9. The computer readable medium according to claim 7, wherein said computer program is initiated when a predetermined telephone number, associated with said remote access server and dedicated to the remote user, is dialed for setting up said first telecommunications.

10. The computer readable medium according to claim 8, wherein said computer program is initiated after performing successfully a user access procedure of said remote user.

11. A computer readable medium having a computer program recorded thereon, the computer program comprising codes adapted to perform the following steps when said computer program is run on a remote terminal:
- setting up a first telecommunications with a remote access server through a telephone network providing calling line identity information of said remote terminal while said first telecommunications is specified as being performed by a remote user;
- disconnecting said first telecommunications by said remote terminal after receiving a tag forwarded from said remote access server to said remote terminal;
- initiating an Internet Protocol session from said remote terminal to said remote access server using said tag.

12. The computer readable medium according to claim 11, wherein a user access procedure of said remote user must be successfully performed before setting up said first telecommunications.

13. The method according to claim 4, wherein said user access procedure comprises a login procedure on said remote terminal.

* * * * *